Dec. 16, 1969   A. HYMAN   3,484,741

SHOCK WAVE SENSOR

Filed March 27, 1968

Abraham Hyman
INVENTOR.

BY John M. Pearce

Attorney

United States Patent Office 3,484,741
Patented Dec. 16, 1969

3,484,741
SHOCK WAVE SENSOR
Abraham Hyman, New Hyde Park, N.Y., assignor to the United States of America as represented by the Secretary of the Navy
Filed Mar. 27, 1968, Ser. No. 716,660
Int. Cl. G01s 3/80
U.S. Cl. 340—16                                    6 Claims

ABSTRACT OF THE DISCLOSURE

The invention relates to an improved shock wave sensor of the amplitude-polarity signal generating type having inherent directionality response and selective frequency response corresponding to the signature of a shock wave to be monitored. Directionality is obtained by the connecting of a shock wave responsive actuating needle to a piezoelectric element for actuation of the piezoelectric element responsive to movement of the needle in a single plane. Selective frequency is obtained by the combined steps of dimensioning the piezoelectric element for selected frequency response and dimensioning the needle to propagate said selected frequency responsive to the monitored shock wave signature.

---

The invention described herein may be manufactured and used by or for the Government of the United States of America for governmental purposes without the payment of any royalties thereon or therefor.

BACKGROUND OF THE INVENTION

Shock wave sensors of the signal generating type have been used with limited success in projectile detector scoring systems to provide indestructible targets eliminating replacement costs, reducing maintenance costs and reducing operational and scoring time required with the destructible type target. A need has also existed for some time for a helicopter defense system utilizing shock wave responsive sensors with the capability of rejecting helicopter ambient noise which interferes with the intended projectile shock wave response of the sensors. Further need has existed for a weapon recognition system capable of distinguishing between the velocities of various projectiles such that recognition of armament fired can be quickly and accurately determined.

Shock wave sensors to date have not had the capability of selective frequency response and directionality such that shock wave signatures can be recognized and the applications mentioned above can be accomplished. It is to this end that the subject invention is directed.

SUMMARY OF THE INVENTION

The invention is summarized as an improved shock wave sensor in which a piezoelectric element having output terminals is connected to respond to an actuating needle connected to the element and mouted for oscillation in a single plane and wherein the dimensions of the element are selected for a desired frequency response corresponding to a shock wave signature to be monitored while the dimensions of the needle are selected to propagate this desired frequency responsive to the monitored projectile shock wave. Additional shielding is provided to further increase the directionality of the sensor for specific applications.

DESCRIPTION OF THE PREFERRED EMBODIMENT

Figure 1:
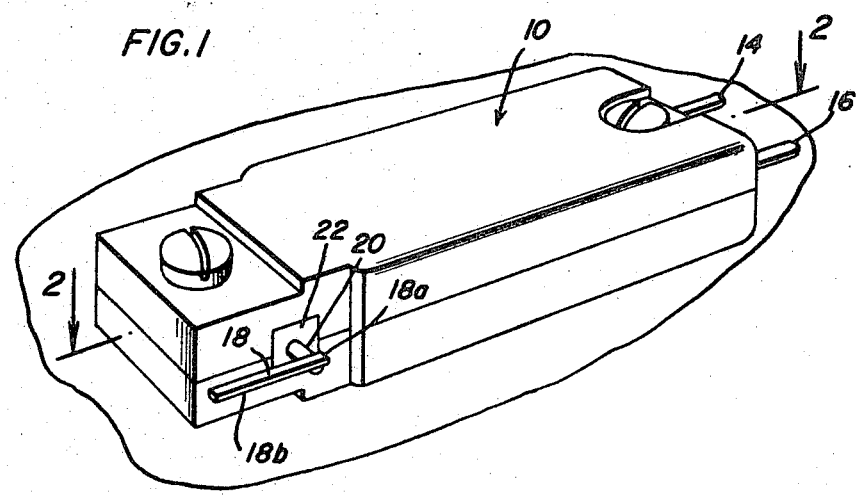
FIG. 1 is a perspective view of a piezoelectric type shock wave sensor in cartridge form incorporating the invention.
Figure 2:
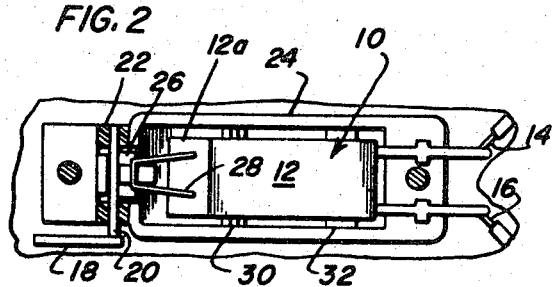
FIG. 2 is a view taken on line 2—2 of FIG. 1, showing the piezoelectric element of the cartridge and mechanical means connecting the needle to the piezoelectric element.

Referring to FIGS. 1 and 2 of the drawing, the sensor 10 shown therein and incorporating the invention includes a piezoelectric element 12 having output terminals 14 and 16 arranged to drive from a shock responsive needle 18 mechanically connected to the free end 12a of the element 12. Any suitable means may be employed to mechanically connect the needle 18 to the element 12 providing the movement of the needle 18 is limited to a single plane.

In the present example the needle 18 is connected adjacent one end thereof to a shaft 20 held by bearings 22 located in one end of a housing 24 in which the element 12 is also mounted. The shaft 20 is connected to the free end 12a of the element 12 by engaging actuating links 26 and 28 connected respectively to the shaft 20 and the element 12. The element 12 is supported in the housing 24 by pairs of spaced supports located respectively in the upper and lower half of the cartridge 24, one pair of supports being shown in FIG. 2 at 30 and 32.

As thus far described, the sensor of FIGS. 1 and 2 provides inherent directionality response to lateral forces only in the single plane of travel of the needle 18 as received on opposite lateral surfaces 18a and 18b of the needle 18. However, it does not provide selective frequency response.

To provide for selective frequency response in accordance with my invention, the needle 18 is selected in dimensions to convert shock wave energies at linear velocity to a desired frequency response of the sensor and the piezoelectric element is selected in dimensions for maximum amplitude signal output at the said desired frequency of needle oscillation.

Thus, for example, if it is desired to make the sensor responsive to ultra-sonic energies, say at projectile velocity of 3200 feet per second, and to filter out sonic noise at say 1000 feet per second, the needle length may be made 5/16 inch and the piezoelectric element dimensioned to respond to 100,000 cycles per second (Hertz).

For clarification the following calculation is given where $f = C/\lambda$
F = frequency in cycles/sec. or Hertz
$\lambda$ = wave length in feet
C = propagation velocity in feet/sec.

The length of the needle from its pivot point to its free end is 5/16 inch, which will equate to $\lambda$.

$\lambda = 5/16$ inch times 1 foot/12 inches = .0324 feet (shock wave) C = 3200 feet/second
therefore $$f = \frac{3200 \text{ feet/second}}{.0324 \text{ feet}} = 100,000 \text{ cycles/second (Hertz)}$$

which is the frequency to which the piezoelectric element will respond.

For noise (i.e. muzzle blast or helicopter blades)

C=1,000 feet/second

λ=5/16 inch=.0324 feet, and $$f = \frac{1000 \text{ feet/second}}{.0324 \text{ feet}} = 30,000 \text{ cycles/second}$$

which is a frequency to which the piezoelectric element selected will not respond.

The sensor therefore accepts and responds to the ultrasonic projectile energy and rejects the ambient noise such that operation of the sensor is not affected by ambient noise.

It is evident from the above that other frequencies of response and rejection can be established by selection of the dimensions of piezoelectric element and needle to suit the application. For example, selection can be made to make the sensor anti-resonant to shock waves at 3,200 feet per second and resonant at some other velocity. This application is of interest in the field of distinguishing one weapon from another, such that the type of enemy weapon fired can be determined. It is also useful in distinguishing between the fire of friend or foe such that return fire upon allied force is avoided. It is also useful in locating enemy fire.

Figure 3:
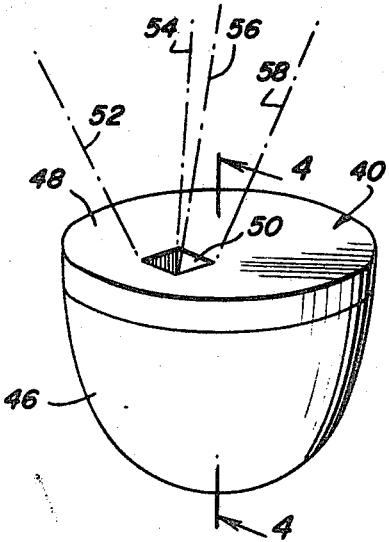
FIG. 3 is a diagrammatic perspective view of the device of FIGS. 1 and 2 housed in a slotted sound wave barrier capsule to augment the inherent directional characteristics of the device.
Figure 4:
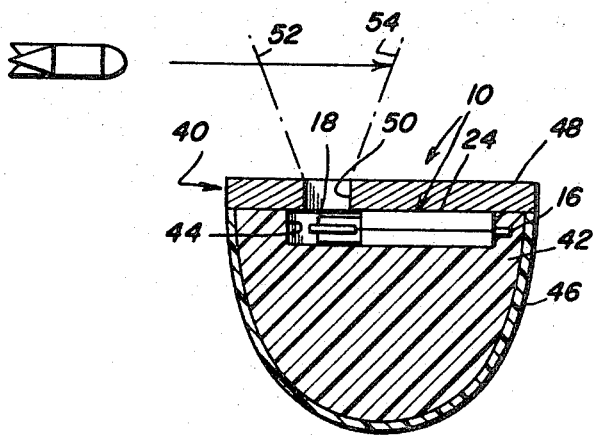
FIG. 4 is a sectional view taken on line 4—4 of FIG. 3.

To further restrict the directionality of the sensor for such applications as in a projectile scoring system such that a specific target zone may be placed upon surveillance, I provide a capsule 40 of shock wave barrier material as shown in FIGS. 3 and 4. The capsule 40 includes a plastic foam 42 recessed as at 44 to receive the sensor cartridge 24, a plastic barrier 46 and a cover 48 slotted as at 50 to define between the lines 52, 54, 56, and 58, a zone through which a projectile must pass in order that its shock wave be received by the needle 18.

Pairs of sensors in the capsulated form are particularly useful when adjacently positioned with the slots facing each other to define a target zone in range fire systems. In each an arrangement a score is recorded when both sensors are actuated. The advantages are the elimination of ambient noise response plus the rejection of any ultrasonic shock wave in an adjacent firing range, because such shock wave could actuate only one of the sensors.

It will be understood that various changes in the details, materials, and arrangements of parts, which have been herein described and illustrated in order to explain the nature of the invention, may be made by those skilled in the art within the principle and scope of the invention.

I claim:

1. An improved projectile shock wave sensor of the amplitude-polarity signal generating type comprising in combination:
   (a) a piezoelectric element having output terminals,
   (b) a shock wave responsive needle,
   (c) means mounting said needle for movement in a single plane and connecting said needle to drive said element when actuated to provide directionality response of said sensor to said shock wave,
   (d) said element being selected in dimensions for response to a selected desired frequency to be monitored, and
   (e) said needle being selected in length to convert shock wave energies at a monitored projectile linear velocity to said desired frequency response of said sensor to provide by the combination of piezoelectric element dimensions and needle length a desired frequency response filtering effect corresponding to a monitored projection linear velocity.

2. A sensor according to claim 1:
   (a) said needle being formed to present a flat surface normal to said single plane.

3. A sensor according to claim 1:
   (a) said mounting means including a cartridge for housing and supporting said element, a shaft connected to said needle, bearing means for said shaft mounted in said cartridge, and connection link means for connecting said needle to said element.

4. A sensor according to claim 2:
   (a) said mounting means including a cartridge for housing and supporting said element, a shaft connected to said needle, bearing means for said shaft mounted in said cartridge, and connection link means for connecting said needle to said element.

5. A sensor according to claim 3 including:
   (a) a capsule of shock wave barrier material having a slot opening of selected dimensions to admit shock waves only from a monitored zone defined by the slot dimensions,
   (b) said cartridge being mounted in said capsule with said needle adjacent said window to receive shock waves thereon from said monitored zone only and to shield said piezoelectric element from said shock waves.

6. A sensor according to claim 4 including:
   (a) a capsule of shock wave barrier material having a slot opening of selected dimensions to admit shock waves only from a monitored zone defined by the slot dimensions,
   (b) said cartridge being mounted in said capsule with said needle adjacent said window to receive shock waves thereon from said monitored zone only and to shield said piezoelectric element from said shock waves.

References Cited

UNITED STATES PATENTS

| | | | |
|---|---|---|---|
| 2,779,788 | 7/1957 | Fitzgerald et al. | 310—8.3 |
| 2,875,353 | 2/1959 | Cavalieri et al. | 310—8.2 |

RICHARD A. FARLEY, Primary Examiner

U.S. Cl. X.R.

310—8.2; 340—10